(12) United States Patent
Nam et al.

(10) Patent No.: US 10,269,039 B2
(45) Date of Patent: Apr. 23, 2019

(54) INTERNET TELEMATICS SERVICE PROVIDING SYSTEM AND INTERNET TELEMATICS SERVICE PROVIDING METHOD FOR PROVIDING PERSONALIZED WEB CONTENTS

(75) Inventors: Kyung Bo Nam, Seongnam-si (KR); Choong Hee Lee, Seongnam-si (KR)

(73) Assignee: NHN CORPORATION, Seongnam-si (KR)

( * ) Notice: Subject to any disclaimer, the term of this patent is extended or adjusted under 35 U.S.C. 154(b) by 966 days.

(21) Appl. No.: 13/216,786

(22) Filed: Aug. 24, 2011

(65) Prior Publication Data
US 2012/0054030 A1    Mar. 1, 2012

(30) Foreign Application Priority Data
Aug. 24, 2010  (KR) .......................... 10-2010-0081963

(51) Int. Cl.
*G06Q 30/00* (2012.01)
*G06Q 30/02* (2012.01)
*G08G 1/0967* (2006.01)
*G10L 13/00* (2006.01)

(52) U.S. Cl.
CPC ... *G06Q 30/0251* (2013.01); *G08G 1/096741* (2013.01); *G08G 1/096775* (2013.01); *G10L 13/00* (2013.01)

(58) Field of Classification Search
USPC .............................. 705/14; 340/457; 455/456
See application file for complete search history.

(56) References Cited

U.S. PATENT DOCUMENTS

| | | | |
|---|---|---|---|
| 6,091,956 A | 7/2000 | Hollenberg | |
| 6,594,579 B1 | 7/2003 | Lowrey et al. | |
| 6,611,740 B2 | 8/2003 | Lowrey et al. | |
| 8,041,779 B2 | 10/2011 | Habaguchi et al. | |
| 2002/0046084 A1* | 4/2002 | Steele et al. .................... | 705/14 |
| 2004/0172193 A1 | 9/2004 | Monde et al. | |
| 2005/0065779 A1* | 3/2005 | Odinak ......................... | 704/201 |

(Continued)

FOREIGN PATENT DOCUMENTS

| | | |
|---|---|---|
| JP | 10-055150 A | 2/1998 |
| JP | 11-338671 | 12/1999 |

(Continued)

OTHER PUBLICATIONS

Non-Final Office Action of U.S. Appl. No. 13/215,630 dated Jan. 24, 2013.

(Continued)

*Primary Examiner* — Afaf Osman Bilal Ahmed
(74) *Attorney, Agent, or Firm* — Harness, Dickey & Pierce, P.L.C.

(57) ABSTRACT

An Internet telematics service providing system and method that may provide various Web contents and information is disclosed. The Internet telematics service providing system may include a request information receiver to receive request information about the Internet telematics service from a telematics system of a vehicle, a content selector to select Internet content associated with the request information via an Internet content providing server, and a content providing unit to provide the selected content to the telematics system. The telematics system may output the content to a user in an auditory form.

20 Claims, 6 Drawing Sheets

(56) References Cited

U.S. PATENT DOCUMENTS

| | | | |
|---|---|---|---|
| 2006/0155437 A1 | 7/2006 | Wang et al. | |
| 2006/0212194 A1 | 9/2006 | Breed | |
| 2008/0004788 A1 | 1/2008 | Dorfstatter et al. | |
| 2008/0147245 A1 | 6/2008 | Koepf et al. | |
| 2008/0248815 A1* | 10/2008 | Busch | 455/456.5 |
| 2009/0134991 A1* | 5/2009 | Shuart | 340/457 |
| 2009/0326753 A1 | 12/2009 | Chen et al. | |
| 2010/0152960 A1 | 6/2010 | Huber et al. | |
| 2010/0191403 A1 | 7/2010 | Krause | |
| 2011/0207439 A1 | 8/2011 | Ross et al. | |
| 2012/0053759 A1 | 3/2012 | Lowrey et al. | |
| 2012/0053824 A1 | 3/2012 | Nam et al. | |
| 2012/0054035 A1 | 3/2012 | Nam et al. | |
| 2012/0054036 A1 | 3/2012 | Nam et al. | |
| 2012/0109579 A1 | 5/2012 | Kersey et al. | |
| 2012/0173075 A1 | 7/2012 | Mays | |
| 2012/0221216 A1 | 8/2012 | Chauncey et al. | |
| 2012/0239462 A1 | 9/2012 | Pursell et al. | |
| 2012/0253888 A1 | 10/2012 | Davidson | |

FOREIGN PATENT DOCUMENTS

| | | |
|---|---|---|
| JP | 2001-108477 | 4/2001 |
| JP | 2001-127718 A | 5/2001 |
| JP | 2002-195843 | 7/2002 |
| JP | 2002-281166 | 9/2002 |
| JP | 2002-334168 | 11/2002 |
| JP | 2003-130660 | 5/2003 |
| JP | 2003-271632 | 9/2003 |
| JP | 2003-331569 A | 11/2003 |
| JP | 2004-157909 | 6/2004 |
| JP | 2004-213404 | 7/2004 |
| JP | 2005-181062 | 7/2005 |
| JP | 2006-036132 | 2/2006 |
| JP | 2007-058344 | 3/2007 |
| JP | 2007-072588 | 3/2007 |
| JP | 2007-148850 A | 6/2007 |
| JP | 2007-219595 | 8/2007 |
| JP | 2007-264766 | 10/2007 |
| JP | 2007-334096 A | 12/2007 |
| JP | 2008-020351 A | 1/2008 |
| JP | 2008-204130 | 9/2008 |
| JP | 2008-225889 | 9/2008 |
| JP | 2009-064254 | 3/2009 |
| JP | 2009-199327 A | 9/2009 |
| JP | 2009-264762 A | 11/2009 |
| JP | 2010-054484 | 3/2010 |
| JP | 2010-140397 A | 6/2010 |
| KR | 10-2004-0050546 | 6/2004 |
| KR | 10-2008-0018780 | 2/2008 |
| KR | 10-0879598 | 1/2009 |
| WO | 2005/057519 | 6/2005 |
| WO | 2007/138744 | 12/2007 |
| WO | WO-2009/041455 A1 | 4/2009 |

OTHER PUBLICATIONS

Non-Final Office Action of U.S. Appl. No. 13/216,223 dated Feb. 13, 2013.
Non-Final Office Action of U.S. Appl. No. 13/217,588 dated Dec. 20, 2012.
Final Office Action for related U.S. Appl. No. 13/217,588 dated Mar. 21, 2013.
Japanese Office Action dated Oct. 8, 2013 for corresponding Japanese Application No. 2011-181328.
Final Office Action dated Jun. 28, 2013 in U.S. Appl. No. 13/216,223.
Japanese Office Action dated Jun. 23, 2015 in corresponding Japanese Application No. 2014-146576.
Final Office Action dated Jul. 25, 2013 in U.S. Appl. No. 13/215,630.
Jul. 20, 2015 Korean Office Action issued in Korean Application No. 10-2010-0081963.

\* cited by examiner

INTERNET TELEMATICS SERVICE PROVIDING SYSTEM AND INTERNET TELEMATICS SERVICE PROVIDING METHOD FOR PROVIDING PERSONALIZED WEB CONTENTS

CROSS REFERENCE TO RELATED APPLICATION

This application claims priority from and the benefit of Korean Patent Application No. 10-2010-0081963, filed on Aug. 24, 2010, which is hereby incorporated by reference for all purposes as if fully set forth herein.

BACKGROUND OF THE INVENTION

Field of the Invention

Exemplary embodiments of the present invention relate to an Internet telematics service providing system and a method that may provide various Internet/Web contents and information.

Discussion of the Background

Recently, there have been active developments in telematics technology for providing various services, for example, an automatic accident report, an emergency service call, and a guide service to a driver through a terminal installed in a vehicle by integrally employing a mobile communication technology, a satellite positioning technology, a map information technology, and/or a vehicle control technology. The telematics technology may provide a more convenient and safe driving environment and an environment in which the driver may use information services in the vehicle without interruption.

There is, however, a need for an enhanced system and method that may provide more information to a driver of a vehicle using various Internet services.

SUMMARY OF THE INVENTION

Exemplary embodiments of the present invention provide an Internet telematics service providing system and method that may provide various contents, provided on a website, in an auditory form in a vehicle.

Exemplary embodiments of the present invention also provide an Internet telematics service providing system and method that enables personalization of content with a minimum number of selections.

Exemplary embodiments of the present invention also provide an Internet telematics service providing system and method that may provide an advertisement, based on a predetermined criterion, while playing back content.

Additional features of the invention will be set forth in the description which follows, and in part will be apparent from the description, or may be learned by practice of the invention.

Exemplary embodiments of the present invention disclose a system for providing a telematics service, the system includes a request information receiver, a content selector, and a content providing unit. The request information receiver receives request information about the telematics service. The content selector selects content associated with the request information. The content providing unit provides the selected content to the telematics system. The telematics system outputs the content in an auditory form.

Exemplary embodiments of the present invention also disclose a method of providing a telematics service. The method includes receiving request information from a telematics system, selecting content associated with the request information, and providing the selected content to the telematics system. The telematics system outputs the content in an auditory form.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present. In contrast, when an element is referred to as being "directly on" or directly connected to" another element or layer, there are no intervening elements or layers present. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, exemplary embodiments of the present invention will be described in detail with reference to the accompanying drawings.

Figure 1:
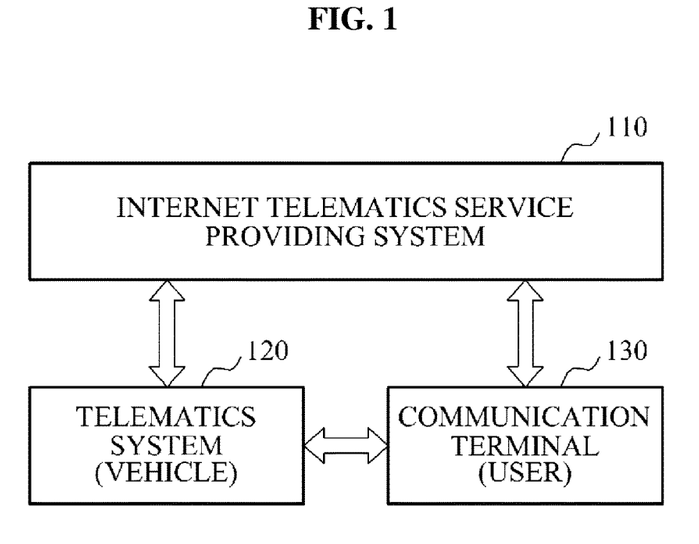
FIG. 1 is a block diagram of a telematics system, a communication terminal, and an Internet telematics service providing system according to exemplary embodiments of the present invention.

FIG. 1 is a block diagram of a telematics system 120, a communication terminal 130, and an Internet telematics service providing system 110 according to exemplary embodiments of the present invention. Referring to FIG. 1, the telematics system 120 of a vehicle and/or the communication terminal 130 used by a user may interact with the Internet telematics service providing system 110.

The Internet telematics service providing system 110 may provide a user with contents received from a website, in interaction with the telematics system 120 and/or the communication terminal 130. For example, the Internet telematics service providing system 110 may provide personalized Internet content to the telematics system 120. While providing content, the Internet telematics service providing system 110 may provide an advertisement corresponding to user circumstances, to the telematics system 120.

The telematics system 120 may be, for example, a navigation terminal installed in the vehicle, and may communicate with the Internet telematics service providing system 110 and/or the communication terminal 130 over a wireless data network. In general, the telematics system 120 may be any electronic device that can communicate with the Internet telematics service providing system 110 and/or the communication terminal 130 in any suitable manner.

The communication terminal 130 may be any suitable mobile device including, for example, a portable personal computer (PC) or a mobile phone, and may communicate with the Internet telematics service providing system 110 and/or the telematics system 120 over any suitable wireless data network. Examples of a wireless data network include, but are not limited to, wireless wide area networks (WANs), wireless metropolitan area networks (WMANs), wireless mesh networks, Worldwide Interoperability for Microwave Access (WiMAX), cellular networks, and other broadband wireless microwave and radio frequency networks.

Figure 2:
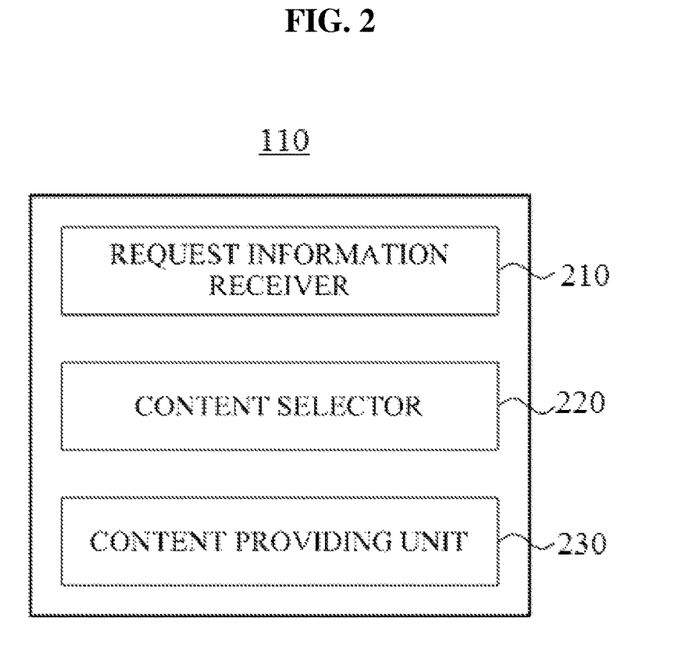
FIG. 2 is a block diagram of an Internet telematics service providing system for providing Internet contents according to exemplary embodiments of the present invention.

FIG. 2 is a block diagram of an Internet telematics service providing system 110 providing Internet contents according to exemplary embodiments of the present invention. Referring to FIG. 2, the Internet telematics service providing system 110 may include a request information receiver 210, a content selector 220, and a content providing unit 230.

The request information receiver 210 may receive request information about the Internet telematics service from the telematics system 120. The request information may include at least one of driving information associated with a vehicle, category information for categorizing Internet content, webpage information associated with a user, and identification (ID) information of the communication terminal 130. For example, the driving information may include a location of a set destination, a driving speed, a current traffic state, and/or passenger information. The set destination may be input by a user of the communication terminal 130 or the Internet telematics service providing system 110. The category information may include weather, news, and/or stocks. The webpage information may include Really Simple Syndication (RSS) feed for a webpage set by the user, emails, blog, café, and/or social networks (e.g., me2DAY). The request information may be data provided by the telematics system 120 or data that is directly input from the user via an Internet/Web service of the telematics system 120 and/or the communication terminal 130.

The content selector 220 may select Internet content associated with the request information via an Internet content providing server (not shown). The Internet content providing server may categorize content and store and maintain the categorized content. The Internet content providing server may provide 1) media content including, for example, audio data, a moving picture, and an image; 2) text content including, for example, a text, news, weather, stocks, a new writing/comment in RSS feed for a webpage set by the user, an email, blog, café, and/or social networks (e.g., me2DaY); and/or 3) a text corresponding to a received message of the communication terminal 130. For example, the Internet content providing server may provide an Internet content platform, and may also provide a media streaming channel for transferring media content and/or an information streaming channel for transferring media content. The media streaming channel may provide content, for example, a playlist set by the user on a website, a list directly selected by the telematics system 120, and a media broadcasting channel. The information streaming channel may provide information such as news, weather, and stocks, provided from the website, a new writing/comment registered to RSS feed for a webpage, an email, blog, café, and social networks (e.g., me2DAY), and a received message of the communication terminal 130.

In some cases, the content selector 220 may extract content associated with the request information and automatically select, from among the extracted content, at least one content to be provided to the user. In some cases, the content selector 220 may extract content associated with the request information and provide a list of the extracted content to the telematics system 120, and may subsequently receive the user's selection of at least one of the content. In some cases, the content selector 220 may provide Internet content as a recommend category so that the user may make a direct selection, and may select content associated with the request information within a category selected by the user.

The content providing unit 230 may provide Internet contents associated with the request information to the telematics system 120. The content providing unit 230 may transfer contents associated with the request information to the telematics system 120 by downloading and/or streaming. For example, the content providing unit 230 may provide, to the telematics system 120, content that is selected based on a location of a destination set by the user, a current traffic state, weather, a driving speed, and/or passenger information. The content providing unit 230 may provide, to the telematics system 120, a new writing/comment registered to a RFF feed for a webpage set by the user, an email, blog, cafe, and/or social networks (e.g., me2DAY), and a received message of the communication terminal 130.

The Internet telematics service providing system 110, as described herein above, may personalize content to be provided to the user based on request information by selectively providing Internet content associated with the request information.

Figure 3:
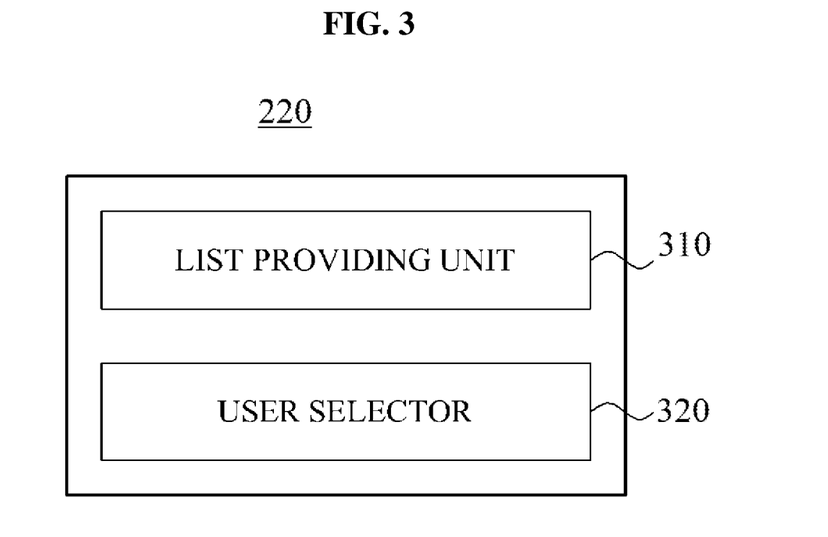
FIG. 3 is a block diagram of a content selector to select Internet content in an Internet telematics service providing system according to exemplary embodiments of the present invention.

FIG. 3 is a block diagram of a content selector 220 to select Internet content in an Internet telematics service providing system 110 according to exemplary embodiments of the present invention. The content selector 220 may include a list providing unit 310 and a user selector 320.

The list providing unit 310 may provide, to the telematics system 120, a category list in which Internet contents are categorized. The list providing unit 310 may provide the Internet contents in a recommend category form so that the user may make a direct selection.

The user selector 320 may receive the user's selection of at least one category in the category list. The user selector 320 may receive a category that is selected by the user in the category list.

The content selector 220 may provide the recommend category form so that the user may make a direct selection, and may select content associated with the request information from among contents corresponding to the category selected by the user.

Content provided from the Internet telematics service providing system 110 may be provided to the user in an auditory form through the telematics system 120. For example, when the content corresponds to media content including audio data, the telematics system 120 may play back the media content in the auditory form using an audio playback function. When the content corresponds to text content including a text, the telematics system 120 may convert the text content to an audio form using a text to speech (TTS) function and play back the text content.

Figure 4:
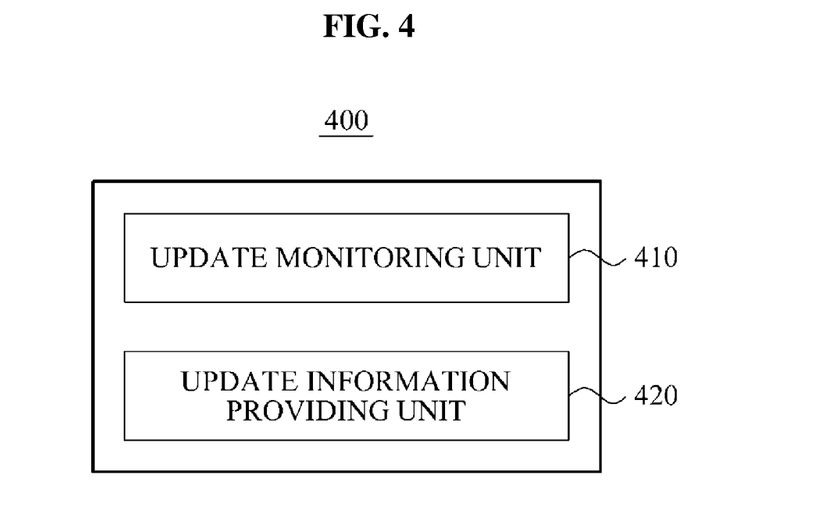
FIG. 4 is a block diagram of an Internet telematics service providing system for providing update information of a webpage associated with a user according to exemplary embodiments of the present invention.

FIG. 4 is a block diagram of an Internet telematics service providing system 400 for providing update information on a webpage associated with a user according to exemplary embodiments of the present invention. The Internet telematics service providing system 400 may correspond to the Internet telematics service providing system 110, and may further include an update monitoring unit 410 and an update information providing unit 420.

The update monitoring unit 410 and the update information providing unit 420 may be utilized when the request information corresponds to webpage information associated with a user. The update monitoring unit 410 may monitor whether information on a webpage associated with the user is updated by communicating with an Internet/Web server (not shown) providing the webpage associated with the user. For example, the update monitoring unit 410 may monitor whether a new text or comment is updated on RSS feed for a webpage set by the user, an email, blog, café, and/or a social network (e.g., me2DAY). The webpage associated with the user may be any suitable webpage that provides information pertaining to the user. For example, the webpage associated with the user may provide information on a vehicle used by the user.

The update information providing unit 420 may provide update information to the telematics system 120 when information on the webpage associated with the user is updated. For example, the telematics system 120 may output the update information as text content in a sound form (e.g., audio) using a TTS function.

The Internet telematics service providing system 400 may provide update information of the webpage associated with the user to the telematics system 120 in real time, and the update information may be heard in audio using the TTS function of the telematics system 120.

Figure 5:
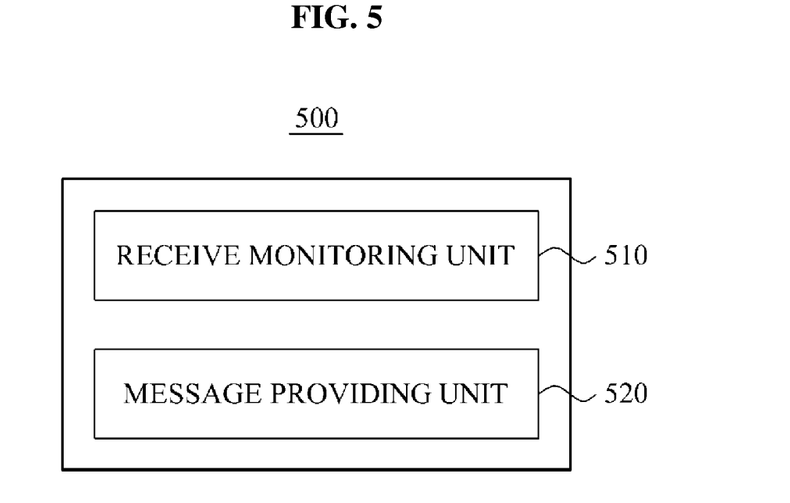
FIG. 5 is a block diagram of an Internet telematics service providing system for providing a received message of a communication terminal associated with a user according to exemplary embodiments of the present invention.

FIG. 5 is a block diagram of an Internet telematics service providing system 500 for providing a received message of the communication terminal 130 associated with a user according to exemplary embodiments of the present invention. The Internet telematics service providing system 500 may correspond to the Internet telematics service providing system 110, and may further include a receive monitoring unit 510 and a message providing unit 520.

The receive monitoring unit 510 and the message providing unit 520 may be utilized when request information corresponds to ID information of the communication terminal 130 of the user. The receive monitoring unit 510 may monitor whether a message is received at the communication terminal 130 via a message providing server (not shown) providing a message service of the communication terminal 130 using an Internet/Web service of the communication terminal 130. For example, the receive monitoring unit 510 may monitor whether a message corresponding to an ID information set by a user is received at the communication terminal 130. The message may be, for example, a Short Messaging Service (SMS) message and/or a Multimedia Messaging Service (MMS) message.

The message providing unit 520 may provide the message to the telematics system 120 when the message is received at the communication terminal 130. The telematics system 120 may output the message in a sound form (e.g., audio) using a TTS function.

The Internet telematics service providing system 500 may provide the received message of the communication terminal 130 to the telematics system 120 in real time, and the received message from the communication terminal 130 may be heard in audio using the TTS function of the telematics system 120.

Figure 6:
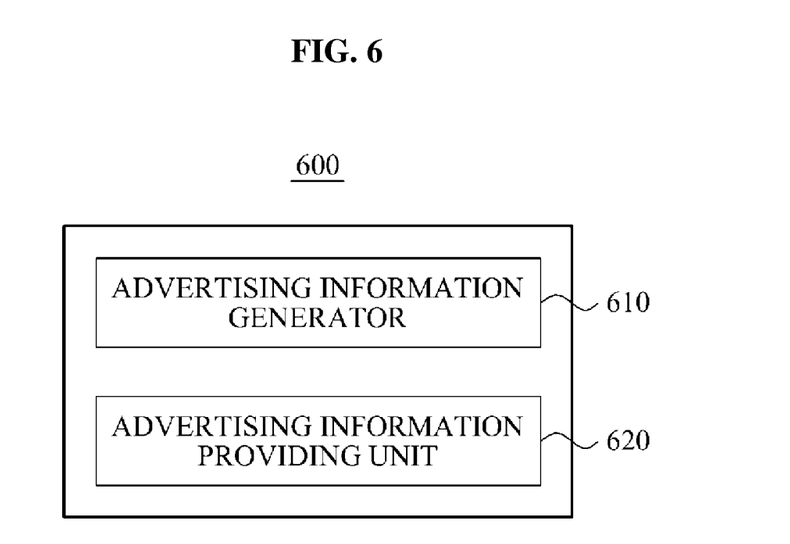
FIG. 6 is a block diagram of an Internet telematics service providing system for providing advertising information associated with request information according to exemplary embodiments of the present invention.

FIG. 6 is a block diagram of an Internet telematics service providing system 600 for providing advertising information associated with request information according to exemplary embodiments of the present invention. The Internet telematics service providing system 600 may correspond to the Internet telematics service providing system 110, and may further include an advertising information generator 610 and an advertising information providing unit 620.

The advertising information generator 610 may generate advertising information associated with request information that is received from the telematics system 120 via an advertisement server (not shown). For example, the advertising information generator 610 may generate a keyword from a destination location corresponding to the request information, a current traffic state, and/or a webpage associated with the user, and may provide an advertisement corresponding to the keyword from the advertisement server.

The advertising information providing unit 620 may provide advertising information associated with the request information to the telematics system 120. The advertising information may be displayed using the telematics system 120. For example, the advertising information may be displayed and may be inserted in an interval where a sound is absent with respect to content being played back. For example, when an advertisement display criterion is set in the advertising information and when the advertising display criterion is satisfied while content is being provided to the telematics system 120, the advertising information providing unit 620 may insert advertising information at an appropriate time without disrupting output of the provided content and may thereby provide the advertising information. An advertisement in which the advertisement display criterion is set may include, for example, an advertisement set to be displayed in a determined time period, and an advertisement set to be displayed when approaching a determined region. The determined time period and determined region may be set by a user of the telematics system 120 or of the communication terminal 130, or a manufacturer of the internet telematics service providing system 110.

The Internet telematics service providing system 600 may provide an advertisement in which a user circumstance is reflected by connecting an advertisement associated with request information to the user via the telematics system 120.

Figure 7:
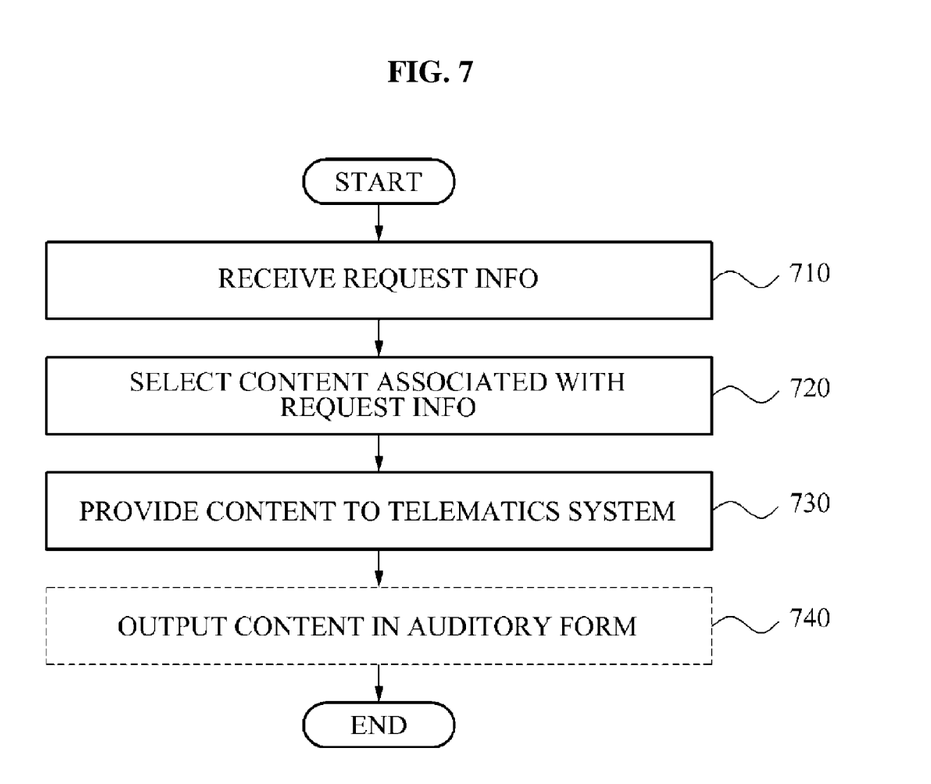
FIG. 7 is a flowchart illustrating an Internet telematics service providing method for providing Internet contents according to exemplary embodiments of the present invention.

FIG. 7 is a flowchart illustrating an Internet telematics service providing method for providing Internet contents according to exemplary embodiments of the present invention. The Internet telematics service providing method may be performed by the Internet telematics service providing system 110.

In 710, the Internet telematics service providing system 110 may receive request information about the Internet telematics service from the telematics system 120. The request information may include at least one of driving information associated with a vehicle, category information for categorizing Internet content, webpage information associated with a user, and ID information of a communication terminal 130 of the user. For example, the driving information may include a location of a set destination, a driving speed, a current traffic state, and/or passenger information. The set destination may be input by a user of the communication terminal 130 or the Internet telematics service providing system 110. The category information may include weather, news, and/or stocks. The webpage information may include RSS feed for a webpage set by the user, emails, blog, café, and/or social networks (e.g., me2DAY).

In 720, the Internet telematics service providing system 110 may select Internet content associated with the request information via an Internet content providing server (not shown). The Internet content providing server may categorize contents and store and maintain the categorized contents. The Internet content providing server may provide 1) media content including, for example, audio data, a moving picture, and an image; 2) text content including, for example, a text, news, weather, stocks, a new writing/comment in RSS feed for a webpage set by the user, an email, blog, café, and/or social networks (e.g., me2DAY); and/or 3) a text corresponding to a received message of the communication terminal 130. In some cases, the Internet telematics service providing system 110 may extract content associated with request information and automatically select, from among the extracted contents, at least one content to be provided to the user. In some cases, the Internet telematics service providing system 110 may provide Internet contents as a recommend category so that the user may make a direct selection, and may select content associated with the request information within a category selected by the user.

In 730, the Internet telematics service providing system 110 may provide Internet contents associated with the request information to the telematics system 120. The content providing unit 230 may transfer contents associated with the request information to the telematics system 120 by downloading and/or streaming. For example, the Internet telematics service providing system 110 may provide, to the telematics system 120, content that is selected based on a location of a destination set by the user, a current traffic state, weather, a driving speed, and/or passenger information. The Internet telematics service providing system 110 may provide, to the telematics system 120, a new writing/comment registered to RFF feed for a webpage set by the user, an email, blog, cafe, and/or social networks (me2DAY), and a received message of the communication terminal 130.

In 740, the telematics system may provide and play back the content that is provided from the Internet telematics service providing system 110, in an auditory form. For example, in some cases, when the content corresponds to media content including audio data, the telematics system may play back the media content in the auditory form using an audio playback function. In some cases, when the content corresponds to text content including a text, the telematics system may convert the text content to an audio form using a TTS function and thereby outputs the text content.

Figure 8:
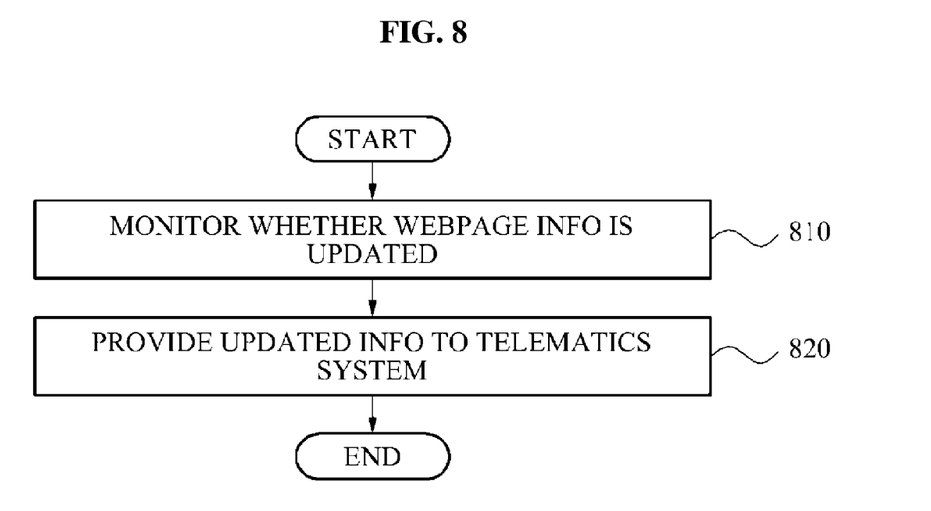
FIG. 8 is a flowchart illustrating an Internet telematics service providing method for providing update information of a webpage associated with a user according to exemplary embodiments of the present invention.

FIG. 8 is a flowchart illustrating an Internet telematics service providing method for providing update information of a webpage associated with a user according to exemplary embodiments of the present invention. The Internet telematics service providing method may be performed by the Internet telematics service providing system 400 of FIG. 4.

In 810, when request information received from the telematics system 120 corresponds to webpage information associated with the user, the Internet telematics service providing system 400 may monitor whether information on a webpage associated with the user is updated by communicating with an Internet/Web server (not shown) providing the webpage associated with the user. For example, the Internet telematics service providing system 400 may monitor whether a new writing or comment is updated on RSS feed for a webpage set by the user, an email, blog, café, and/or a social network (e.g., me2DAY).

In 820, the Internet telematics service providing system 400 may provide update information to the telematics system 120 when information on the webpage associated with the user is updated. For example, the telematics system may output the update information as text content in a sound form (e.g., audio) using a TTS function.

Figure 9:
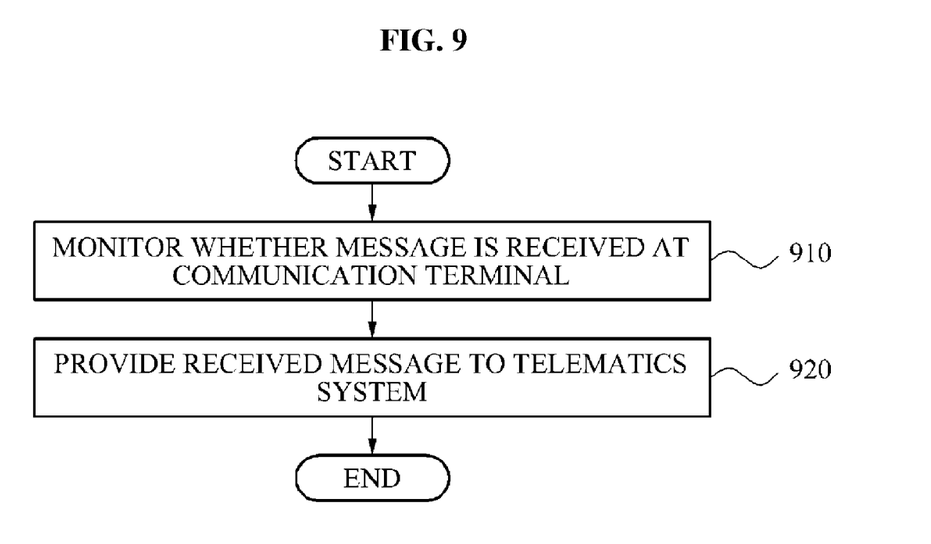
FIG. 9 is a flowchart illustrating an Internet telematics service providing method for providing a received message of a communication terminal associated with a user according to exemplary embodiments of the present invention.

FIG. 9 is a flowchart illustrating an Internet telematics service providing method for providing a received message of the communication terminal associated with a user according to exemplary embodiments of the present invention. The Internet telematics service providing method may be performed by the Internet telematics service providing system 500 of FIG. 5.

In 910, when request information received from the telematics system 120 corresponds to ID information of the communication terminal 130 of the user, the Internet telematics service providing system 500 may monitor whether a message is received at the communication terminal 130 via a message providing server (not shown) providing a message service of the communication terminal 130 using an Internet/Web service of the communication terminal 130. For example, the Internet telematics service providing system 500 may monitor whether a message corresponding to an ID information set by a user is received at the communication terminal 130. The message may be, for example, a Short Messaging Service (SMS) message and/or a Multimedia Messaging Service (MMS) message.

In 920, the Internet telematics service providing system 500 may provide the message to the telematics system 120 when the message is received at the communication terminal 130. The telematics system 120 may output the message in a sound form (e.g., audio) using a TTS function.

Figure 10:
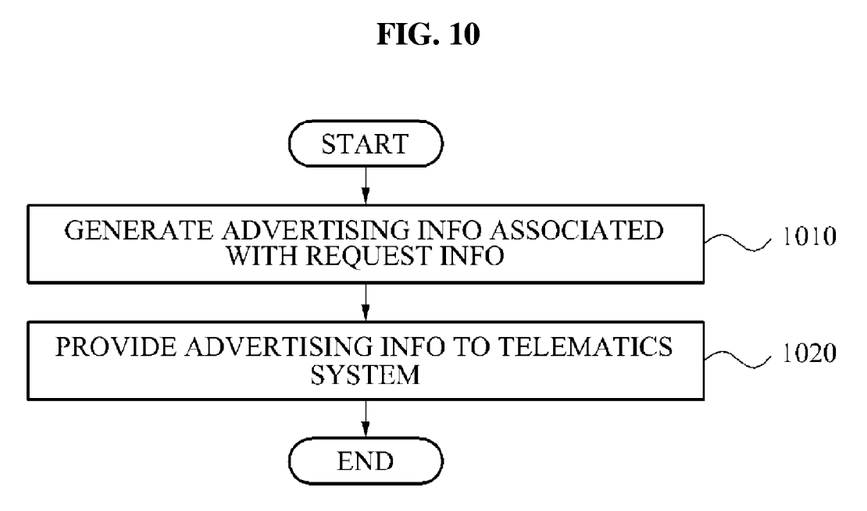
FIG. 10 is a flowchart illustrating an Internet telematics service providing method for providing advertising information associated with request information according to exemplary embodiments of the present invention.

FIG. 10 is a flowchart illustrating an Internet telematics service providing method for providing advertising information associated with request information according to exemplary embodiments of the present invention. The Internet telematics service providing method may be performed by the Internet telematics service providing system 600 of FIG. 6.

In 1010, the Internet telematics service providing system 600 may generate advertising information associated with request information that is received from the telematics system 120 via an advertisement server (not shown). For example, the Internet telematics service providing system 600 may generate a keyword from a destination location corresponding to the request information, a current traffic state, and/or a webpage associated with the user, and may provide an advertisement corresponding to the keyword from the advertisement server.

In 1020, the Internet telematics service providing system 600 may provide advertising information associated with the request information to the telematics system 120. The advertising information may be displayed using the telematics system 120. For example, the advertising information may be inserted in an interval where a sound is absent with respect to content being played back, and may be displayed.

As described above, according to exemplary embodiments of the present invention, various contents provided on the Internet may be transferred to a telematics system 120 of a vehicle and the telematics system 120 may play back content in an auditory form. It is possible to readily provide a user's desired content in real time by personalizing content to be provided to the user with a minimum number of selections. In addition, an advertisement in which a user circumstance is reflected may be provided by inserting advertising information at an appropriate time without disrupting output of the provided content.

The exemplary embodiments according to the present invention may be recorded in computer-readable media including program instructions to implement various operations embodied by a computer. The media may also include, alone or in combination with the program instructions, data files, and/or data structures. The media and program instructions may be those specially designed and constructed for the purposes of the present invention, or they may be of the kind well-known and available to those having skill in the computer software arts. Examples of computer-readable media include magnetic media such as hard disks, floppy disks, magnetic tape, optical media such as CD ROM disks and DVD, magneto-optical media such as floptical disks, and hardware devices that are specially configured to store and perform program instructions, such as read-only memory (ROM), random access memory (RAM), and flash memory. Examples of program instructions include both machine code, such as produced by a compiler, and files containing higher level code that may be executed by the computer or a processor. The described hardware devices may be configured to act as one or more software modules in order to perform the operations of the above-described exemplary embodiments of the present invention. For example, it should be understood that each of the Internet telematics service providing system 110, the telematics system 120, and the communication terminal 130 may include a storage unit, a processor, an input unit, and an output unit to execute the exemplary embodiments described herein. For example, the telematics system 120 may include a processor to control reception, via the input unit, of signals, messages, and/or data from the Internet telematics service providing system 110 and the communication terminal 130, to process the received signals, messages, and/or data, and to output the processed received signals, messages, and/or data via the output unit (e.g., speaker). For instance, the content selector 220 may be a processor to perform selection of content as described hereinabove, and a speaker (not shown) of the telematics system 120 may output an audio signal corresponding to a message received from communication terminal 130.

It will be apparent to those skilled in the art that various modifications and variation can be made in the present invention without departing from the spirit or scope of the invention. Thus, it is intended that exemplary embodiments of the present invention cover the modifications and variations of this invention provided they come within the scope of the appended claims and their equivalents.

What is claimed is:

1. A system to provide a telematics service, the system comprising:
    a telematics system comprising a navigation terminal;
    a telematics server including a processor, the processor including,
        a request information receiver configured to receive request information from the telematics system, the request information including webpage information associated with a user and identification information of the navigation terminal,
        a content selector configured to select content associated with the request information from a content server,
        a content providing unit configured to provide the selected content to the telematics system,
        an update monitoring unit configured to monitor whether information on a webpage is updated by communicating with a server providing the webpage, the monitoring being in response to receiving the request information when the request information corresponds to the webpage information associated with the user,
        an advertising information generator configured to generate advertising information associated with the request information by sending the advertising information to an advertisement server and receiving an advertisement from the advertisement server,
        an advertising information providing unit configured to provide the advertisement based on the advertising information to the telematics system during a portion of the provided content when a sound output is absent such that the advertisement is provided without disrupting the sound output of the provided content,
    wherein the telematics system is configured to output the content in an auditory form.

2. The system of claim 1, wherein the content comprises text content, and wherein the telematics system is configured to output the text content as a sound using a text to speech (TTS) function.

3. The system of claim 1, wherein
    the content comprises media content comprising audio data, and
    the telematics system is configured to output the media content using an audio playback function.

4. The system of claim 1, wherein the content selector comprises:
    a list providing unit configured to provide, to the telematics system, a category list; and
    a selector configured to receive a selection of at least one category of the category list, and
    wherein the content providing unit is configured to provide the selected content to the telematics system based at least on a driving speed.

5. The system of claim 1, wherein the content selector is configured to automatically select at least one content from the content associated with the request information, or to provide a list of the content to the telematics system and receive a selection of at least one content.

6. The system of claim 1, wherein the request information comprises at least one of driving information associated with a vehicle, category information to categorize the content, webpage information, and identification (ID) information of a communication terminal.

7. The system of claim 6, further comprising:
an update information providing unit configured to provide update information to the telematics system in response to information on the webpage being updated,
wherein the telematics system is configured to output the update information in an auditory form.

8. The system of claim 6, further comprising:
a receive monitoring unit configured to monitor whether a message is received at the communication terminal via a server using an Internet service in response to the request information comprising the ID information of the communication terminal; and
a message providing unit configured to provide the message to the telematics system in response to the message being received at the communication terminal,
wherein the telematics system is configured to output the message in an auditory form.

9. The system of claim 1, wherein the advertising information comprises a keyword from at least one of a destination location corresponding to the request information, a current traffic state of a vehicle that includes the telematics system, and the webpage.

10. The system of claim 9, wherein
the advertising information is displayed through the telematics system based on an advertisement display criterion set in the advertisement information, and
the advertising information providing unit configured to provide the advertising information by inserting the advertising information into the content during an interval within the content where a sound output is absent.

11. A method of providing a telematics service via a telematics system comprising a navigation terminal, the method comprising:
receiving, by a processor, request information from the telematics system, the request information including webpage information associated with a user and identification information of the navigation terminal;
selecting, by the processor, content associated with the request information from a content server;
providing, by the processor, the selected content to the telematics system;
monitoring, by the processor, whether information on a webpage is updated by communicating with a server providing the webpage, the monitoring being in response to the receiving the request information when the request information corresponds to the webpage information associated with the user;
generating, by the processor, advertising information associated with the request information;
obtaining, by the processor, an advertisement from an advertisement server based on the advertising information; and
providing, by the processor, the advertisement to the telematics system during a portion of the provided content when a sound output is absent such that the advertising advertisement is provided without disrupting the sound output of the provided content,
wherein the telematics system is configured to output the content in an auditory form.

12. The method of claim 11, wherein
the content comprises text content; and
the telematics system outputs the text content as a sound using a text to speech (TTS) function.

13. The method of claim 11, wherein
the content comprises media content comprising audio data; and
the telematics system plays the media content using an audio playback function.

14. The method of claim 11, wherein the selecting comprises:
receiving a selection of at least one category of a category list, and
wherein the selected content is provided to the telematics system based at least on a driving speed.

15. The method of claim 11, wherein the selecting comprises:
automatically selecting at least one content from the content associated with the request information, or providing a list of the content to the telematics system to receive a selection of at least one content.

16. The method of claim 11, wherein the request information comprises at least one of driving information associated with a vehicle, category information to categorize the content, webpage information, and identification (ID) information of a communication terminal.

17. The method of claim 16, further comprising:
providing update information to the telematics system in response to information on the webpage being updated,
wherein the telematics system outputs the update information in an auditory form.

18. The method of claim 16, further comprising:
monitoring whether a message is received at the communication terminal via a server using an Internet service of the communication terminal; and
providing the message to the telematics system in response to the message being received at the communication terminal,
wherein the telematics system outputs the message in an auditory form.

19. The method of claim 11,
wherein the advertising information comprises a keyword from a destination location corresponding to the request information.

20. The method of claim 19, wherein
the advertising information is displayed through the telematics system based on an advertisement display criterion set in the advertisement information, and
the providing includes providing the advertising information by inserting the advertising information into the content during an interval within the content where a sound output is absent.

* * * * *